US007360993B2

United States Patent
Fraenkel

(10) Patent No.: US 7,360,993 B2
(45) Date of Patent: Apr. 22, 2008

(54) FATIGUE RESISTANT LARGE HOLLOW ROTOR BLADE FOR UNDERWATER ENERGY CONVERTER

(75) Inventor: Peter L. Fraenkel, London (GB)

(73) Assignee: Marine Current Turbines, Ltd., Bristol (GB)

( * ) Notice: Subject to any disclaimer, the term of this patent is extended or adjusted under 35 U.S.C. 154(b) by 259 days.

(21) Appl. No.: 10/529,091

(22) PCT Filed: Sep. 25, 2003

(86) PCT No.: PCT/GB03/04112

§ 371 (c)(1),
(2), (4) Date: Dec. 8, 2005

(87) PCT Pub. No.: WO2004/029448

PCT Pub. Date: Apr. 8, 2004

(65) Prior Publication Data

US 2006/0152011 A1   Jul. 13, 2006

(30) Foreign Application Priority Data

Sep. 27, 2002   (GB) ................... 0222466.5

(51) Int. Cl.
*F03B 3/12* (2006.01)
(52) U.S. Cl. ............. 415/232; 416/241 R; 416/DIG. 4; 415/6
(58) Field of Classification Search .......... 416/232, 416/241 R, DIG. 4; 415/8; 417/334; 290/43, 290/54
See application file for complete search history.

(56) References Cited

U.S. PATENT DOCUMENTS

| 3,437,549 A | 4/1969 | Winer |
| 3,648,635 A | 3/1972 | Hashemi |
| 4,095,918 A | 6/1978 | Mouton, Jr. et al. |
| 4,306,157 A | 12/1981 | Wracsaricht |
| 4,524,285 A | 6/1985 | Rauch |

(Continued)

FOREIGN PATENT DOCUMENTS

FR    2 292 878    9/1974

(Continued)

*Primary Examiner*—Ninh H. Nguyen
(74) *Attorney, Agent, or Firm*—Brinks Hofer Gilson & Lione

(57) ABSTRACT

A method and means of counteracting the effects of variation in static pressure acting upon a hollow rotor blade or hydrofoil (6, 7) for devices capable of extracting energy from a moving column (8) of water or other liquid within which the rotor of hydrofoil is located whether the device rotates as in the case of an axial flow turbine or whether it reciprocates in the flow such that cyclic static pressure fluctuations caused by vertical movement of the rotor blades or hydrofoils through the water column (8) including the step of equalising the pressure inside and outside the rotor blade or hydrofoil by filling any voids (17) within the hollow rotor blades or hydrofoils with a liquid in such manner as to allow the external surface (26) of said rotor blades or hydrofoils to "breathe"; i.e., to expand and contract under the influence of external static pressure variations, whereby cyclic static pressure fluctuations caused by vertical movement of the rotor blades or hydrofoils through the water column (8) do not cause fluctuating stresses in the rotor blades or hydrofoils.

16 Claims, 3 Drawing Sheets

U.S. PATENT DOCUMENTS

| | | | |
|---|---|---|---|
| 5,281,856 A | 1/1994 | Kenderi | |
| 6,104,097 A * | 8/2000 | Lehoczky | 290/54 |
| 6,531,788 B2 | 3/2003 | Robson | |
| 6,652,221 B1 * | 11/2003 | Praenkel | 415/3.1 |
| 6,955,049 B2 | 10/2005 | Krouse | |

FOREIGN PATENT DOCUMENTS

| | | |
|---|---|---|
| GB | 960598 | 6/1964 |
| WO | WO 2004/029448 A1 | 4/2004 |

* cited by examiner

FATIGUE RESISTANT LARGE HOLLOW ROTOR BLADE FOR UNDERWATER ENERGY CONVERTER

BACKGROUND OF THE INVENTION

This invention relates to improvements in rotor blades and/or hydrofoils particularly as applied to water current turbines and other water current kinetic extractors.

In particular the present invention relates to turbines and other such devices capable of interacting with a flow of fluid in such a manner as to transfer energy from the fluid to a mechanical device.

More particularly the present invention relates to turbines or other such devices arranged to be driven by the action of a flow of water or other liquid medium.

Thus, the present invention relates in particular to the use of turbines and other devices involving relative movement between the device and water for extracting kinetic energy from flowing water for the purposes of utilising such kinetic energy to produce either electricity or shaft power for utilisation for a required purpose.

Flowing water (which may be either fresh water or sea water) used in the context of this invention is a characteristic of tidal, marine, estuarial or river currents.

THE PRIOR ART

It is known how to use turbines for such purposes. For example in our British Patents GB 2256011 B, GB 2311566 B and GB 2348250 B we have disclosed constructions pertaining to water driveable turbines that are so positioned that their rotors are so supported within the water column of the sea, a river or an estuary that the flow of water may turn the rotor to produce either shaft power or electricity for utilisation for a required purpose.

FURTHER BACKGROUND OF THE INVENTION

When a turbine is used in such a way that it is driven by a flow of water the extraction of energy from the flow causes reactive forces that need to be counteracted by some form of fixed or floating and anchored structure. Hence, in practice, the rotor or any other moving element of such a turbine will be held in place within the water column by a fixed structure in such a manner that it delivers usable power through a rotating shaft.

In most cases the mechanism for extracting energy from the flow will utilise devices incorporating lift surfaces in the form of hydrofoils rotating in the manner of an axial flow turbine but in some cases other devices may be used which oscillate or reciprocate as a result of interaction with the passing water flow and in such a case the devices may deliver an oscillating force in some manner other than via a rotating shaft, such as, for example, through hydraulic or pneumatic cylinders or through any other appropriate mechanism capable of converting said reciprocating motion into some convenient form for the transmission of power to a further device capable of usefully applying such power.

The concepts of the present invention are applicable to such devices whether or not such devices comprise rotating turbines or oscillating hydrofoil apparatus capable of extracting energy from flowing water currents.

The need for the proposals of the present invention arises as a result of variation in static pressure experienced by any vertical movement through a water column.

It is well known that the static pressure in a column of water will increase as a result of the density of the water column by approximately 1 (one) bar for every 10 metres extra depth i.e., the static water pressure at a depth of 10 metres below the surface will be approximately 1 bar, at a depth of 20 metres it will be approximately 2 bar and so on. As a result of this, any sizeable turbine will experience variations of static pressure if its active components move through a vertical height. Thus in the case of a turbine rotor of 20 metres diameter the rotor will experience a static pressure variation of approximately 2 bar between the top edge of the rotor and the bottom edge of the rotor assuming said rotor is mounted with its rotational axis horizontal so as to effectively face the flow of water to most effectively extract energy from the water flow.

As a result the rotating rotor blades will be exposed to cyclic pressure variations.

In the 20 metres diameter example, each rotor blade will experience, on average, approximately plus or minus 1 bar variation between the position when a rotor blade is at the uppermost point of rotation compared with one at the lowermost point of rotation, assuming the middle of each blade (i.e., halfway between the axis of rotation and the tip of the blade) as a reference point. This same phenomenon will apply to any reciprocating device which moves in a vertical plane through the water column; for example a horizontal hydrofoil device that moves up and down will experience a static pressure variation of approximately 1 bar for each 10 metres of vertical movement in the water column.

In most cases the rotor blades or foils are hollow, as is preferred for any sizeable structure, because clearly a solid rotor blade would tend to be unacceptably heavy particularly in the case of a turbine with a large rotor. In such cases the static pressure variations that will apply when the rotor blade or foil either rotates in a vertical plane in the water column or oscillates vertically will tend to manifest themselves as a pressure difference between the interior void of the rotor blade or foil and the external fluid. If the rotor blade or foil is effectively a sealed container, then the cyclic pressure difference between the interior and exterior of said container will manifest itself as a large cyclic force seeking to effectively make the blade or foil surface "breath"; i.e., when the foil or blade is in a low position in the water column it will tend to be compressed by the external fluid and when it rises the reducing pressure will tend to make the blade seek to expand. Since the resulting force will be a function of the surface area multiplied by the pressure difference it can manifest itself as a very large and frequently recurring load on the surface of the rotor blade or foil. This situation presents the designer with some serious difficulties in terms of the need to avoid failure by cyclic stress fatigue of the material.

Filling the void in any rotor blade or hydrofoil with lightweight material (e. g., foamed plastic) that is not easily compressible could be perceived as a solution to this problem, but the probability is that the surface of the rotor-blade or hydrofoil will flex under the influence of the cyclic static pressure variations and will therefore suffer from fatigue loadings combined with a risk of failure in the event that the surface material of the rotor blade of hydrofoil ceases to be bonded securely to the internal filler, de-laminates and hence creates a void.

OBJECTS OF THE INVENTION

It is an object of the present invention to provide rotor blades or hydrofoils suitable for devices capable of extracting energy from a moving water column, whether the device rotates as in the case of an axial flow turbine or whether it reciprocates in the flow.

A further object of the present invention to provide improved rotor blades or hydrofoils for turbine rotors or reciprocating foils which function by moving within the water column of flowing currents the purpose of extracting energy, whether they be at sea, in rivers or in estuaries.

A still further object of the invention is intended to provide a rotor or hydrofoil construction that serves to mitigate or reduce the structural problems that are likely as a result of static pressure variations acting upon the rotor and which would tend to cause any sealed and hollow rotor blade to seek to "breathe" (i.e., expand and compress) under the influence of cyclic pressure variations caused by movements in the water column.

STATEMENTS OF THE INVENTION

According to a first aspect of the invention there is provided a method of counteracting the effects of variation in static pressure acting upon a hollow rotor blade or hydrofoil immersed in a column of flowing water or other liquid by equalising the pressure inside and outside the rotor blade or hydrofoil.

Preferably, the pressure is equalised by filling any voids in the rotor blade or hydrofoil with a liquid.

According a further aspect of the invention there is provided a method of counteracting the effects of variation in static pressure acting upon a hollow rotor blade or hydrofoil for devices capable of extracting energy from a moving column of water or other liquid within which the rotor of hydrofoil is located including the step of equalising the pressure inside and outside the rotor blade or hydrofoil by filling any voids within the hollow rotor blades or hydrofoils with a liquid in such manner as to allow the external surface of said rotor blades or hydrofoils to "breathe"; i.e., to expand and contract under the influence of external static pressure variations, whereby cyclic static pressure fluctuations caused by vertical movement of the rotor blades or hydrofoils through the water column do not cause large fluctuating stresses in the rotor blades or hydrofoil.

According to a still further aspect of the invention the interior of a hollow rotor blade or hydrofoil is flooded with liquid in such a way that it is not possible for a void to form which can allow the rotor blades of hydrofoils to 'breathe' during cyclic movement through a vertical distance in moving column of water or other liquid.

In a preferred method voids within a rotor blade or hydrofoil are filled with water or other substantially incompressible liquid, the arrangement being such that potential for the casing or outer surface of the hydrofoil or rotor blade to suffer undesired stresses and strains as a result of the aforementioned 'breathing' effect will be significantly reduced.

According to a still further aspect of the invention there is provided a turbine rotor blade or hydrofoil of a hollow construction, wherein the interior of a hollow rotor blade or hydrofoil is adapted to be fillable with a liquid in such a way that it is not possible for a void to form with the blade or hydrofoil interior such as to allow the rotor blades or hydrofoils to 'breathe' during cyclic movement of the blade or hydrofoil through a vertical distance in a moving column of water or other liquid.

A further aspect of the invention provides a turbine rotor or hydrofoil f hollow construction, and including means for enabling equalisation of internal and external pressures arising on the blades or hydrofoil during cyclic movement of the blade or hydrofoil through a vertical distance when located in a moving column of water or other liquid.

Preferably, the pressure equalisation is arranged to be effected by means of pressure balancing control means provided upon the rotor blade or hydrofoil.

Conveniently, the pressure control is effected by means of a diaphragm or piston arrangement.

Conveniently, the rotor blades or hydrofoils are provided with openings at the extremities thereof for the purposes of the filling of the blades or hydrofoils with water or other liquid and to allow air to be displaced when the rotor or hydrofoil is submerged.

In a preferred construction the interior of said rotor blade or hydrofoil is treatable treated with anti-fouling and/or anti-corrosive coatings to prevent internal marine growth, bio-fouling and/or corrosion.

Preferably, such openings in a rotor blade or hydrofoil may be closed with a diaphragm or a piston in a cylinder arrangement, the arrangement being such as to enable equalisation of the pressure of an internal fluid filling the internal voids relative to external pressure conditions.

With such an arrangement, separate filling and draining orifices can be provided with provision for said orifices to be closed with suitable plugs or caps to contain the internal fluid and prevent ingress of the external fluid.

BRIEF DESCRIPTION OF THE DRAWINGS

For a better understanding of the invention and to show how to carry the same into effect reference will now be made to the accompanying drawings in which.

DESCRIPTION OF PREFERRED EMBODIMENTS

Figure 1:
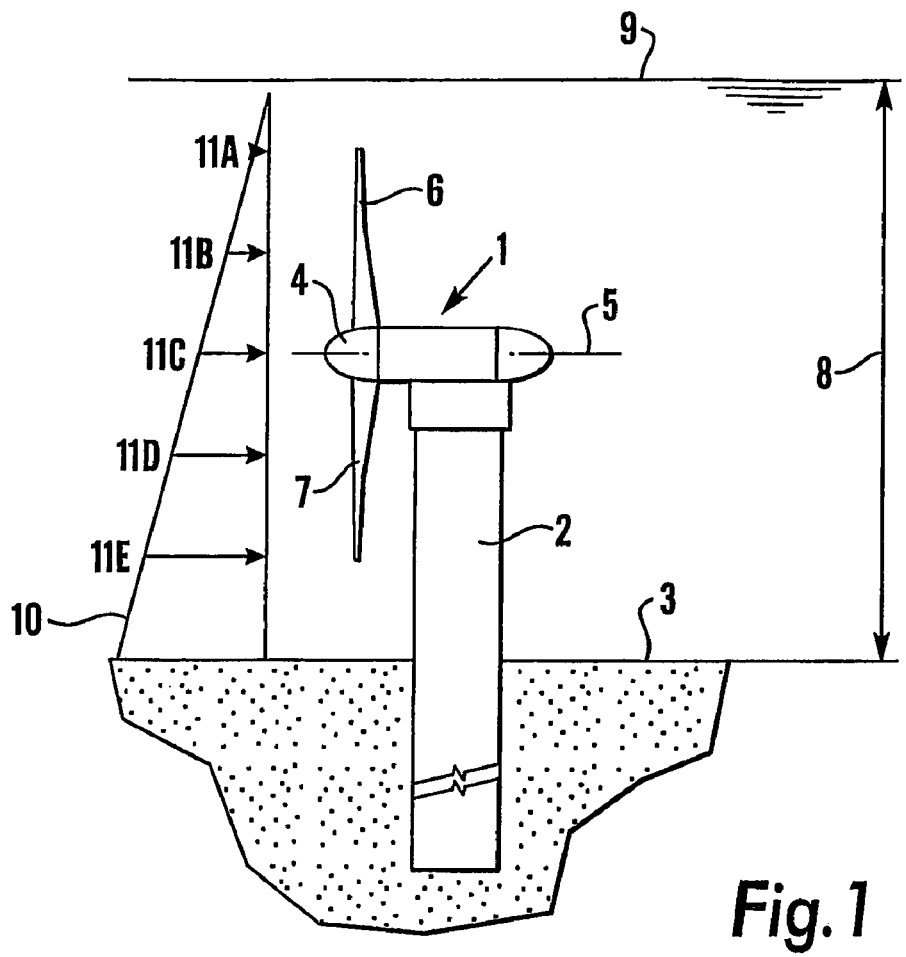
FIG. 1 schematically illustrates in side view a turbine and its rotor supported for submerged operation within a column of water together with a symbolic representation of static pressure variation in the water column.

Referring now to FIG. 1, a turbine 1 is mounted at the upper end of a support 2 that is upstanding from the sea bed 3. It will be understood that the support could be located in a river or esturial location. The turbine 1 incorporates a two bladed axial flow rotor 4 rotatable about a horizontal axis 5. The rotor 4 includes two blades or hydrofoils 6 and 7 that are diametrically opposite each other. It will be understood that if more then two blades are provided they would be equiangularly spaced around the rotor axis 5.

The turbine 1, rotor 4 and the support 2 are immersed in a column 8 of moving water whose surface is indicated at 9.

In the following description the references to rotor blades are intended also to relate to the use of hydrofoils.

In the FIG. 1 the rotor blades 6 and 7 represent the interactive components of a water current kinetic energy converter i.e., turbine for taking energy from the moving water column 8 as a transmitted force that can be harnessed. As has been mentioned these blades 6 and 7 can experience static pressure variation as a result of the vertical movement they undergo during their rotation/movements in the water column 8.

The left hand side of FIG. 1 schematically illustrates the nature of static pressure variation increase downwards through the column 8 of water by the inclined line 10. A series of increasing length arrows 11A to 11E represent the static pressure level at a series of defined points in the column of water. Thus the arrow1 1A represents the pressure at the tip of the upper blade 6 when in a vertical setting (as shown) whilst the arrow 11B indicates the mean static pressure at the lengthways centre of the upper blade 6. The arrow 11C indicates the static pressure at the rotor axis 5. The arrow 11D indicates the mean pressure at the lengthways centre of the blade 7 whilst the arrow HE indicates the static pressure at the tip of the lower blade 7.

Figure 2:
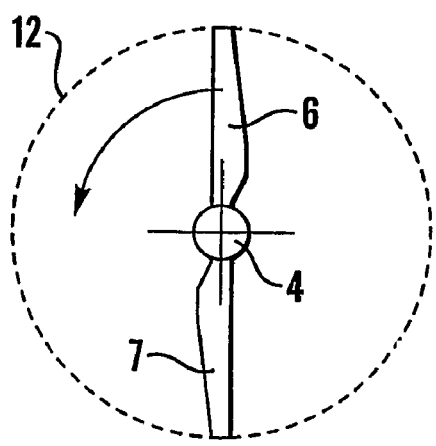
FIG. 2 schematically illustrates a front view of the rotor of the turbine of FIG. 1.

FIG. 2 is a front view of the rotor 4 In the FIG. 2 the arrow 12 schematically illustrates the cyclic nature of the static pressures acting on the blades 6 and 7.

The area swept by the rotor 4 is defined by the circle 12.

During rotation of the static pressure on the blades thereof will fluctuate whereby consequential forces incurred by the surface material of any rotor blade will be cyclical and large since they are a function of both the surface area of the rotor blade and the blade surface pressure variation.

For example, in relation to pressures on a rotor blade 6 or 7 a pressure variation of 1 bar (caused by a vertical static pressure variation of just 10 metres) will cause a force of approximately IOOKN per square metre, which force is the equivalent of a 10 tonne force acting on each square meter of the surface.

It will be appreciated that the proposals of the present invention serve to at least reduce the development of significant fluctuating force between the exterior and interior of hydrofoils or rotor blades 6 and 7 moving vertically in a cyclic manner within the water column 8.

In practice, if such fluctuating force is reduced, then the surfaces of the rotor blades need carry no more load than that which will be generated through the process of transmitting lift forces from the immersing liquid into the structure of the rotor or the energy extracting device. A consequence of reducing the loads on such components allows the design thereof to be simplified, and additionally enables a reduction in the in-strength requirements for the blades 6 and 7 which in turn offers cost-advantages. Furthermore, the reduction of operational forces acting on the blades could well also offer further advantages in extending the fatigue life of the rotor blades or hydrofoils.

In accordance with the proposals of the invention the flooding of the interior of the rotor blade with liquid is arranged to be effected in such a way that it is not possible for a void to form within a hollow blade or hydrofoil which can allow the aforementioned "breathing" effect to occur when the rotor blade or hydrofoil moves cyclically through a vertical distance in the water column.

Since liquids are relatively incompressible it has been realised that by replacing an air-filled blade interior with liquid improves the situation. However, in practice, unless the liquid is pressurised there remains a possibility that a vacuum or low pressure void could form the presence of which could impose both high stresses and high strains on the surface material of the foil or rotor blade.

Therefore, it is proposed that rotor blades in question should be filled with a liquid that is pressurised to a pressure similar to the mean pressure at the operating depth in the water column. It will be understood that steps would be taken to ensure that the filling liquid is as free as appropriate of dissolved gasses or impurities that could come out of solution and cause a void to form.

Figure 3:
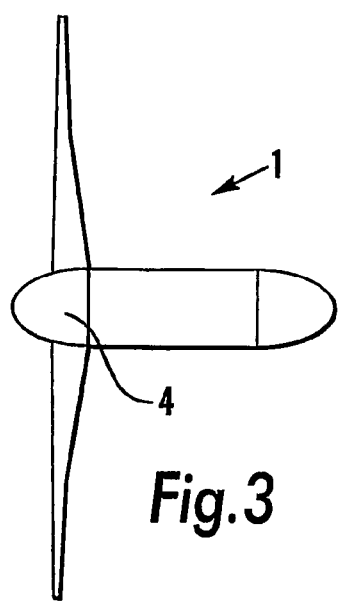
FIG. 3 schematically illustrates in outline side view a turbine and rotor assembly.
Figure 4:
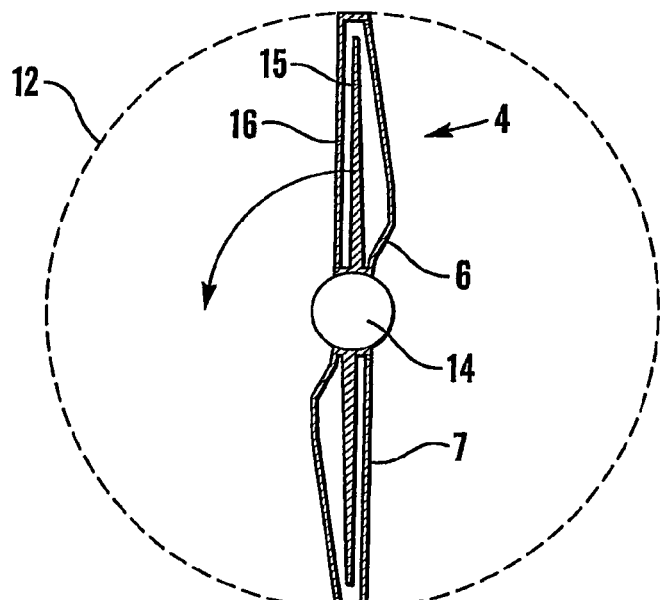
FIG. 4 is a sectional front view of the rotor of the assembly of FIG. 3.
Figure 5:
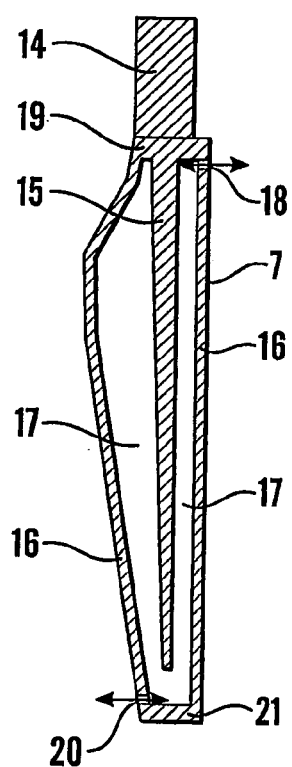
FIG. 5 is a sectional view to a larger scale of a blade of the rotor shown in FIG. 4.

Referring now to FIGS. 3, 4 and 5 in which FIG. 3 very schematically illustrates in very schematic form a turbine 1 and its rotor 4, FIG. 4 illustrating in front sectional view a schematic representation of the rotor 4 illustrated in FIG. 3, and FIG. 5 in schematic form to a larger scale the construction of a rotor blade 7.

In particular the blade of FIGS. 4 and 5 incorporates a hub 14, connecting with a main spar or structural member core 15 surrounded by a an external casing or skin 16 which gives the correct profile or shape to the blade for efficient development of the lift forces necessary to extract energy from the passing fluid.

In practice, the casing 16 will be connected to the spar by structural ribs or other components (not shown in the Figures) so as to maintain the requisite relative positioning between the core and skin. From the enlarged schematic view of a rotor blade in FIG. 5 it can be seen that in the case of a two-bladed axial flow rotor 4 (as illustrated) this structure can result would result in the presence of voids 17 within the envelope or surface casing 16 since a primary purpose of the construction is to avoid a solid structure.

For the purposes of this invention such structural ribs or other components they will be open or perforated so as to allow the passage of void filling fluid throughout interior of the rotor blade Orifices 18 are provided at the blade root 19 and orifices 20 at the tip 21 of the rotor blade to permit water (or whatever the liquid the system operates in) to flood into the interior/void 16 of the blade and thus fill such interior/void and to permit air trapped within it to escape.

In other words these orifices 18/20 in the rotor blade or foil will be such as to allow the water (or whatever fluid) to fill the voids 17 when the rotor is first submerged and conversely they will allow the liquid to drain out when it is lifted above the water surface.

In practice, when using devices of this kind either in the sea or in river and estuarial situations, there may be a problem with marine biological growth inside the flooded void 17.

Such growth/development of such marine biological growth can be mitigated or prevented the use of appropriate anti-fouling internal finish inhibit any such growth from taking place. However, there remains the possibility that the use of such finishes by the nature of the construction of the blades or foils could well not result in total coverage of the internal surfaces present within the blades or foils.

Figure 6:
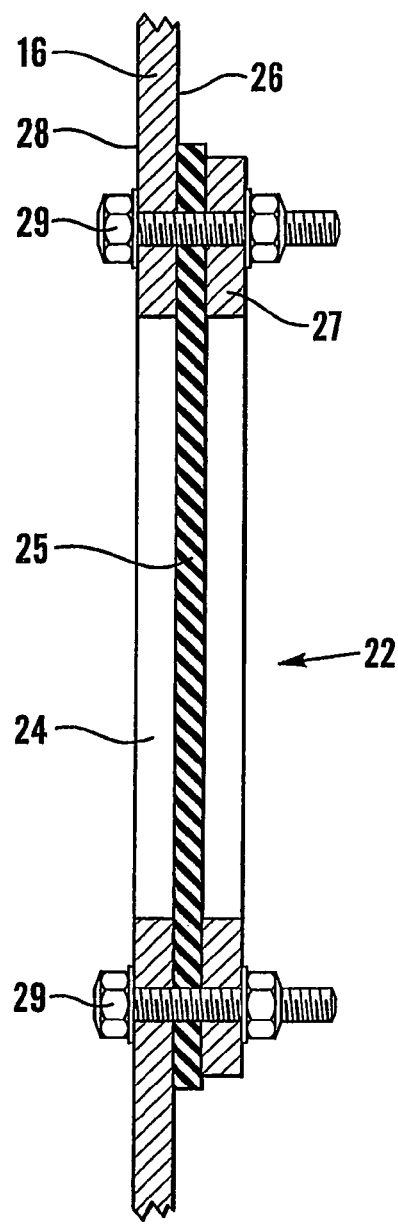
FIGS. 6 and 7 respectively are schematic sectional views of a diaphragm and a piston arrangement which will equalise the internal and external pressure while maintaining separation between the external working fluid and the internal filling fluid
Figure 7:
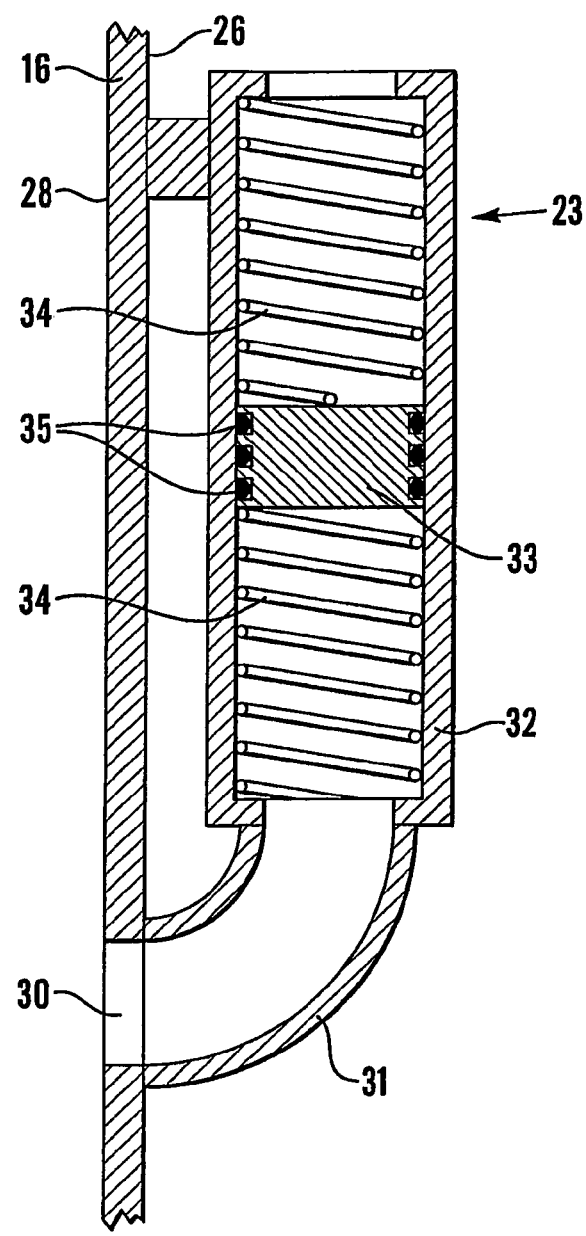

FIGS. 6 and 7 schematically illustrates first and second mechanical methods for mitigating or preventing this problem and can be utilised at least as additional protection to the use of anti-fouling finishes.

Basically the arrangements illustrated in FIGS. 6 and 7 illustrate the elimination of open orifices by the used of closed systems which enable static pressure fluctuations to be accommodated without allowing for free admission of water or expulsion of water.

FIG. 6 and 7 respectively illustrate the replacement of orifices by a diaphragm or a piston pressure equaliser arrangement 22/23 that allows equalisation of the internal and external pressure while maintaining a physical separation between the external working fluid and the internal filling fluid.

The internal fluid when diaphragms or pistons are used to contain it would also probably but not necessarily be water (in the case of a water turbine) but if water is to be used it would be dosed with inhibitor to prevent any undesirable bio-activity and also to mitigate against any corrosion.

The diaphragm pressure equaliser 22 is mounted to the outer casing or envelope 16 of the rotor blade by removing a section of the casing to form an orifice 24. A flexible diaphragm 25 which may be made from an elastomeric material is clamped to the inside surface 26 of the casing by a ring clamp plate 27. The outer surface of the casing 16 is indicated at 28. This plate 27 is conveniently held in place by any convenient means such as nuts and bolts 29 (as illustrated) or by some other means such as clamps (not shown). When a pressure differential occurs between the external and internal sides 28 and 26 of the rotor blade casing 16 it will produce a minor movement of the diaphragm which due to the high bulk modulus of water will only need to move a small amount to equalise the pressure; i.e. the diaphragm will tend to keep the liquid sealed inside the rotor blade at a similar instantaneous static pressure as that of the orifice 24. It will be understood that FIG. 6 illustrates an example of how a diaphragm might be arranged; other configurations may also be possible to achieve the same objective.

In the example of a piston-based pressure equaliser 23, the outer envelope or casing 16 of the rotor blade 6/7 has an orifice 30 which connects via a short length of pipe 31 to a cylinder 32. The cylinder 32 contains a piston 33 constrained towards the centre of the axial length of the cylinder by springs 34 arranged on each side of the piston 33. The piston 33 is a close fit within the cylinder 32 and is fitted with seals 35 to prevent leakage. Any variation in static pressure at the orifice 30 will tend to move the piston 33 a small amount against the actions of the springs 34 until the pressure on each side of the piston is equalised, thereby adjusting the pressure in the interior of the blade to be close to that externally.

The figure illustrates one example of how a cylinder 32 and piston 33 can be arranged; other configurations may also be possible to achieve the same objective.

Whilst the FIGS. 6 and 7 illustrate embodiments of diaphragm and piston and cylinder arrangements it will be understood that the concept of equalising the pressure inside and outside the rotor blade or hydrofoil with a diaphragm or piston arrangement and are not intended to restrict the application to illustration of the details for implementing such a design.

When the rotor blade or hydrofoil is to be filled with a liquid as just described, means (not shown) will be provided both for draining the liquid in order to lighten the rotor blade or foil for transport and when installing it and for refilling the internal voids with liquid prior to operating the system. An important aspect is to ensure no air or other gas is trapped within the rotor blade or hydrofoil so provision for bleeding off any trapped air or other gas is an essential requirement in the event that the filling and draining holes do not adequately serve the purpose.

The invention claimed is:

1. A method of counteracting the effects of variation in static pressure upon a hollow rotor blade or hydrofoil immersed in flowing water or other liquid comprising the step of equalising the pressure inside and outside the rotor blade or hydrofoil.

2. A method as claimed in claim 1, wherein the equalising step comprises filling any voids in the rotor blade or hydrofoil with a liquid.

3. A method as claimed in claim 1 or 2 further comprising the step of providing pressure balancing control means upon the rotor blade or hydrofoil.

4. A method as claimed in claim 3 wherein the pressure balancing control means comprises a diaphragm or piston arrangement provided upon the rotor blade of hydrofoil.

5. A method as claimed in claim 1 and further comprising the steps of filling any voids within the rotor blade or hydrofoil with water or other substantially incompressible liquid, the arrangement being such that potential for the casing or outer surface of the hydrofoil or rotor blade to suffer undesired stresses and strains as a result of the a 'breathing' effect will be significantly reduced.

6. A method of counteracting the effects of variation in static pressure acting upon a hollow rotor blade or hydrofoil extracting energy from a moving column of water or other liquid within which the rotor of hydrofoil is located, the variation in static pressure being caused by vertical movement of the rotor blades or hydrofoils through the water column, the method comprising the step of equalising the pressure inside and outside the rotor blade or hydrofoil by filling any voids within the hollow rotor blades or hydrofoils with a liquid in such manner as to allow the external surface of said rotor blades or hydrofoils to expand and contract under the influence of external static pressure variations, whereby cyclic static pressure fluctuations caused by vertical movement of the rotor blades or hydrofoils through the water column do not cause fluctuating stresses in the rotor blades or hydrofoils.

7. A method for filling the voids in the rotor blades or hydrofoils for devices capable of extracting energy from a moving water column whereby cyclic static pressure fluctuations caused by vertical movement of the rotor blades or hydrofoils through the water column do not cause large fluctuating stresses as a result of air-filled or gas-filled voids, comprising the step of allowing the external surface of said rotor blades or hydrofoils to expand and contract under the influence of external static pressure variations.

8. A method as claimed in claim 1 or 6 or 7 and further comprising the step of flooding the interior of the hollow rotor blade or hydrofoil with liquid in such a way that it is not possible for a void to form which can allow a "breathing" effect when the rotor blade moves cyclically through a vertical distance in the water column.

9. A turbine rotor or hydrofoil of hollow construction, comprising means for enabling equalisation of internal and external pressures arising on the blades or hydrofoil during cyclic movement of the blade or hydrofoil through a vertical distance when located in a moving column of water or other liquid.

10. A turbine rotor blade or hydrofoil of hollow construction as claimed in claim 9, and further comprising an interior of the hollow rotor blade or hydrofoil adapted to be filled with a liquid in such a way that it is not possible for a void to form within the blade or hydrofoil interior such as to allow the rotor blades or hydrofoils to 'breathe' during cyclic movement of the blade or hydrofoil through a vertical distance in a moving column of water or other liquid.

11. A turbine rotor blade or hydrofoil of hollow construction as claimed in claim 10, and further comprising openings at the rotor blade or hydrofoil extremities for the purposes of the filling of the blades or hydrofoils with water or other liquid and to allow air to be displaced when the rotor or hydrofoil is submerged.

12. A turbine rotor blade or hydrofoil of hollow construction as claimed in claim 9, or 10 or 11, and further comprising anti-fouling and/or anti-corrosive coatings on the interior of said rotor blade or hydrofoil to prevent internal marine growth, bio-fouling and/or corrosion.

13. A turbine rotor blade or hydrofoil of hollow construction as claimed in claim 9, and further comprising pressure balancing control means provided upon the rotor blade or hydrofoil to enable the pressure equalisation of the rotor blade or hydrofoil.

14. A turbine rotor blade or hydrofoil of hollow construction as claimed in claim 13, and further comprising a diaphragm means provided on the blade or hydrofoil for enabling equalisation of the pressure of an internal fluid filling the interior relative to external pressure conditions.

15. A turbine rotor blade or hydrofoil of hollow construction as claimed in claim 13, and further comprising a piston and cylinder arrangement provided on the blade or hydrofoil for enabling the pressure of the pressure of an internal fluid filling the internal voids relative to external pressure conditions.

16. A turbine rotor blade or hydrofoil of hollow construction as claimed in claim 13 or 14 or 15, and further comprising separate filling and draining orifices for the liquid used for filling the rotor or hydrofoil and plugs or caps to contain the filling fluid and prevent ingress of the external fluid.

* * * * *